No. 769,953. PATENTED SEPT. 13, 1904.
G. H. MINIER.
WATER HEATER.
APPLICATION FILED NOV. 23, 1903.
NO MODEL.
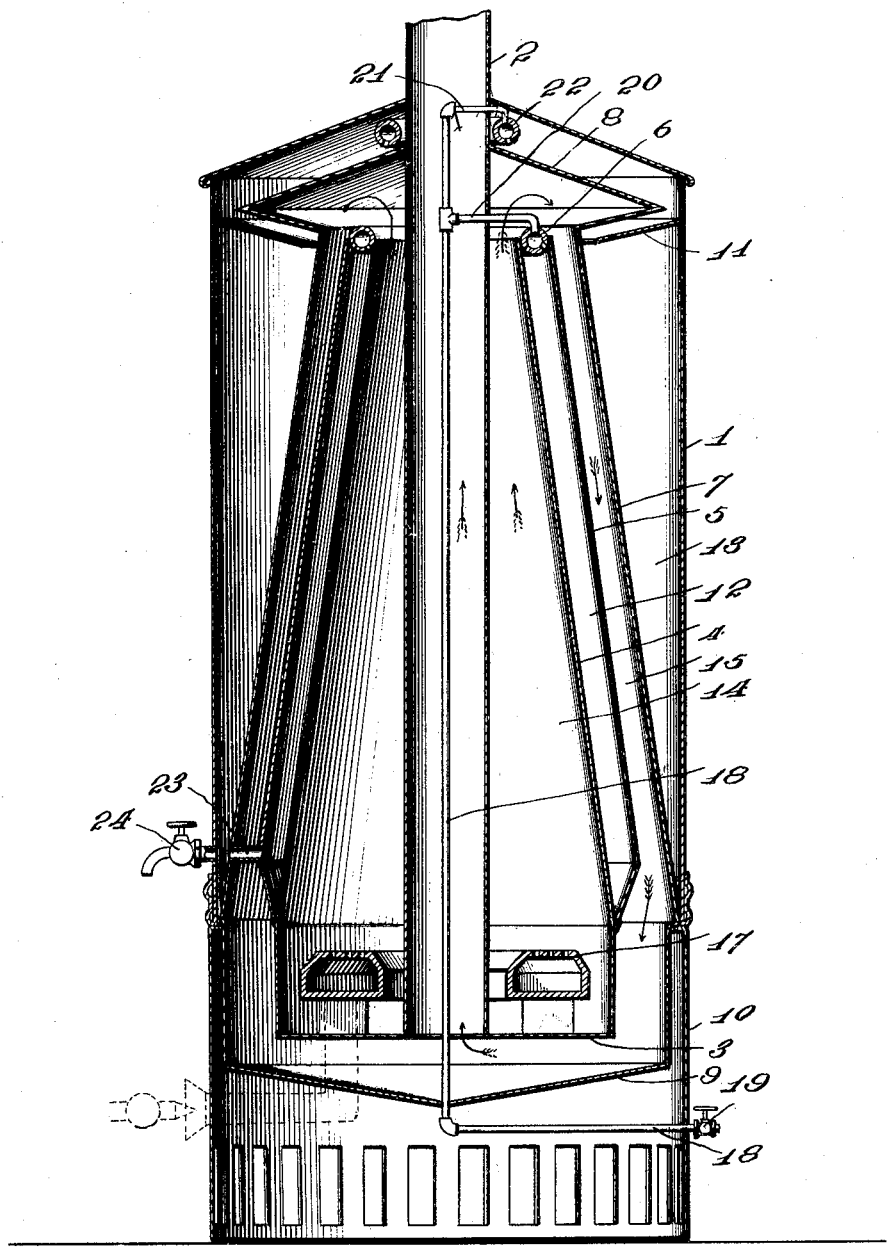
Witnesses
L. Gifford Handy
Edwin C. Vrooman
Inventor
George H. Minier,
By Mason, Fenwick & Lawrence
Attorneys No. 769,953. Patented September 13, 1904.

UNITED STATES PATENT OFFICE.

GEORGE H. MINIER, OF SOUTH PASADENA, CALIFORNIA.

WATER-HEATER.

SPECIFICATION forming part of Letters Patent No. 769,953, dated September 13, 1904.

Application filed November 23, 1903. Serial No. 182,369. (No model.)

*To all whom it may concern:*

Be it known that I, GEORGE H. MINIER, a citizen of the United States, residing at South Pasadena, in the county of Los Angeles and State of California, have invented certain new and useful Improvements in Water-Heaters; and I do hereby declare the following to be a full, clear, and exact description of the invention, such as will enable others skilled in the art to which it appertains to make and use the same.

This invention relates to improvements in water-heaters; and the object of the invention is to construct a suitable casing within which is mounted a burner and which contains means for spraying liquids within suitable casings which are heated by the aforesaid burner, and thereby imparting heat to the sprayed liquids.

Another object of the invention is to arrange within a suitable casing a plurality of water-cylinders which are heated with suitable means and to communicate said cylinders with an outer discharge-pipe which is provided with means for controlling the supply of water from said cylinders.

Another object of the invention is to arrange centrally of an outer casing a suitable supply-pipe and to mount within said outer casing a plurality of inner casings which form water-receiving receptacles as well as conducting means for flames from a suitable heating device for heating the water discharged within the receptacles.

With these and other objects in view the invention consists of certain novel constructions, combinations, and arrangements of parts, as will be hereinafter fully described and claimed.

In the accompanying drawing the figure represents a vertical central section of a heater, disclosing the casings in an assembled position.

Referring to the drawing by reference-numerals, 1 designates an outer cylindrical casing, within which is mounted a cylindrical casing 2, upon which is secured, by means of an annular horizontal member 3, a cylindrical casing 4. Secured upon said casing 4 is a cylindrical casing 5, and secured between said casings 4 and 5 at their top is a suitable annular member or pipe 6, which is provided with a plurality of apertures permitting of the spraying or discharging of suitable liquids into a compartment formed between said casings 4 and 5. Secured to the inner face of the cylindrical outer casing 1 is a cylindrical casing 7, which is provided with an annular dome 8 and with a closed bottom 9. The outer casing 1 is also provided with an apertured sectional casing 10, upon which the main portion of the cylindrical outer casing 1 is mounted. Near the top of the casing 1 and secured to its inner walls is a suitable annular member or ledge 11, which is slightly bent so as to conduct the sprayed liquids which are discharged upon the upper portion of the dome 8 of the inner casing 7 to the compartment formed by assembling the casing 7 within the casing or outer cylinder 1.

Within the heater there are formed a plurality of water-receptacles, which are preferably designated by reference-numerals 12 and 13, and also arranged around said water-receptacles are flues or casings 14, 15, and 16. Within the casing or compartment 14 is mounted a suitable burner 17, which is connected with a supply-pipe communicating with a reservoir. A water-supply pipe 18 is provided with a suitable valve 19 for controlling the supply of liquids discharged into the receptacles 12 and 13. Said pipe 18 extends through the bottom 9 of the casing 7 and is centrally arranged within the flue 16 and is provided at its upper ends with elbows or extensions 20 and 21, which communicate with suitable annular receptacles 6 and 22. The inner water-receptacle 12 is provided with a plurality of horizontal connecting-pipes 23, which provide means for discharging the heated liquids from compartment 12 into the outer water-compartment 13. Upon the outer casing 1 and secured near the bottom is a suitable faucet 24 for extracting the heated liquids from the outer receptacle 13.

The water is supplied to the annular members 6 and 22 and is sprayed upon the dome 8 and also within the water-receptacle 12. It will be seen upon considering the drawing that the water which is sprayed upon the dome 8 is then discharged upon the ledge or member 11 and is then discharged into the outer water-receptacle 13. The flame or heat from the burner 17 is adapted to pass up the flue 14 and downward through the flue 15 to the central flue 16 and is next discharged to the atmosphere. By this arrangement the inner water-receptacle 12 is entirely surrounded by heated atmosphere, and the outer receptacle 13 is provided with an inner heated surface when the device is in operation. By using the heat from the burner as heretofore described the compartments are not only heated thereby, but also the supply-pipe 18, which is centrally secured within the tube or central casing 16 and provides means whereby the discharged liquids are heated before the same are conducted to the spraying members 6 and 22.

It will be seen by the arrangement of the different compartments within the outer casing that the heat generated by the burner is compelled to traverse three compartments before the same is discharged to the outer atmosphere.

Although I have described the preferred form of the invention, it will be obvious that there are certain changes and modifications which may be made and which will clearly fall within the scope of the invention, and I therefore reserve the right to make such changes.

Having thus fully described my invention, what I claim as new, and desire to secure by Letters Patent, is—

1. A water-heating apparatus, comprising inner and outer water-chambers, a plurality of central heating-compartments assembled within said inner chamber, one of said compartments closed at the bottom thereof and communicating at the top with a compartment formed between the inner and outer chamber, a compartment formed beneath the central heating-compartments and communicating with the compartment formed between the inner and outer chambers and with the other central heating-compartment, and means for supplying heat to said compartments and liquids to said chambers.

2. In a water-heater, the combination of an inner and an outer water-receptacle, a burner-compartment formed within the inner water-receptacle, passages communicating with said burner-compartment and entirely surrounding the inner water-receptacle and communicating with a centrally-arranged discharge member, and means centrally arranged within said discharge member for supplying liquids to said water-receptacles.

3. A water-heating apparatus, comprising inner and outer water-receptacles formed with a heating-compartment between the same, a plurality of centrally-arranged heating-compartments, one of the central compartments closed at one end, a heating mechanism mounted within said closed compartment, communicating means between said compartment provided with said heating mechanism and said compartment formed between said water-receptacles, and communicating means between said compartment formed between said water-receptacles and the other central heating-compartment providing means whereby the heat radiated within the heating-compartment, is passed entirely around the inner water-receptacle and discharged from said apparatus through the central compartment.

4. A water-heating apparatus, comprising inner and outer communicating water-receptacles, a heating-compartment formed between said receptacles, a plurality of heating-compartments arranged centrally within said water-receptacles, one of said central heating-compartments opened at one end thereof and the other central heating-compartment opened at both ends, and communicating means arranged with said compartments and receptacles, permitting of a continuous communication between said compartment provided with a closed end and said compartment formed between the water-receptacles, and thence to the central compartment provided with opened ends, thereby permitting of a communication with the outer atmosphere.

5. A water-heating apparatus, comprising an inner and outer water-receptacle, an annular extension secured to the outer wall of the outer water-receptacle, a dome formed upon the inner wall of said outer receptacle and partially overhanging said annular extension, separate annular spraying members assembled with said water-receptacles, one of said spraying members arranged within said outer water-receptacle above said dome, means for supplying liquids to said spraying members, and means for supplying heat to said water-receptacles.

6. In a water-heater, the combination of an inner and an outer water-receptacle, said outer receptacle provided with an annular extension secured to its outer wall, a dome formed upon the inner wall of said outer receptacle overhanging said annular extension, annular spraying members secured near the top of said water-receptacles and provided with means for supplying liquids thereto, a burner-compartment secured centrally within said receptacles, communicating means secured to said liquid-receptacles, and means carried by said outer receptacle for controlling the discharge of liquid therefrom.

7. A liquid-heating apparatus, comprising inner and outer communicating liquid-receptacles, a heating-compartment formed between said receptacles, a heating-compartment formed within said inner liquid-receptacle, a secondary compartment assembled with said heating-compartment formed within said inner liquid-receptacle, communicating means between said inner heating-compartment and said heating-compartment formed between said receptacles, and communicating means between said heating-compartment formed between said liquid-receptacles and said secondary compartment.

8. A water-heating apparatus, comprising a plurality of water-compartments, a spraying member secured entirely within one of said compartments, a spraying member secured at one end of one of the other water-compartments and entirely closing the same, a heating-compartment arranged centrally within said water-receptacles, a discharge-flue arranged within said central heating-compartment, and means forming a continuous communication between said central heating-compartment and a compartment formed between the water-receptacles and communicating with said discharge-flue.

9. A liquid-heating apparatus, comprising inner and outer liquid-receptacles, a dome formed integrally with the inner wall of said outer liquid-receptacle, conducting means formed within said outer liquid-receptacle beneath said dome for discharging liquids toward the inner wall thereof, means for supplying liquids to said inner receptacle and to said outer receptacle above said dome, means for conducting heat from a compartment formed within the inner water-receptacle around said receptacle and discharging the same centrally from said apparatus.

In testimony whereof I hereunto affix my signature in presence of two witnesses.

GEORGE H. MINIER.

Witnesses:
BEN. F. HERSHE,
O. W. ORCUTT.